United States Patent [19]

Miller

[11] Patent Number: 4,900,040

[45] Date of Patent: Feb. 13, 1990

[54] SEALING DEVICE

[76] Inventor: Richard E. Miller, 6618 W. 174th Pl., Tinley Park, Ill. 60477

[21] Appl. No.: 192,780

[22] Filed: May 11, 1988

[51] Int. Cl.⁴ .................................................. F16J 15/16

[52] U.S. Cl. ........................................ 277/30; 49/303; 160/40; 160/201; 277/143

[58] Field of Search .................. 49/303; 277/138, 143, 277/158, 164, 12, 30; 160/40, 201, 209

[56] References Cited

U.S. PATENT DOCUMENTS

| | | | |
|---|---|---|---|
| 1,824,212 | 9/1931 | Johnson | 49/303 |
| 1,865,568 | 7/1932 | Johnson | 49/303 |
| 1,892,986 | 1/1933 | Johnson | 160/40 |
| 2,827,114 | 3/1958 | Stroup | 160/201 |
| 2,827,115 | 3/1958 | Stroup | 160/201 |
| 2,837,151 | 6/1958 | Stroup | 160/201 |
| 3,027,937 | 4/1962 | Wilson | 160/40 |
| 4,643,239 | 2/1987 | Wentzel | 160/201 |
| 4,741,542 | 5/1988 | Kimerly | 49/477 |

*Primary Examiner*—Allan N. Shoap
*Assistant Examiner*—Jeffrey J. Hohenshell
*Attorney, Agent, or Firm*—Willian Brinks Olds Hofer Gilson & Lione

[57] ABSTRACT

A sealing device for sealing a side of a slideable door. The sealing device includes a seal member, a striker plate attached to the sealing member, an outer wall, and a plurality of links in the form of resilient ribs positioned between the seal member and the outer wall. The resilient ribs force the seal member downwardly and laterally against the side of the door when the door engages the striker plate. A web may be attached to the resilient ribs, the seal member and the outer wall. The web prevents the passage of air between the ribs, and retracts the seal member from the door when the door ceases to exert a force against the striker plate.

13 Claims, 3 Drawing Sheets

2

26
30
46
42
45
42
34
42
48
28
44
52
45
50
34
42
42
42
40

SEALING DEVICE

This invention relates to sealing devices for slideable barriers, for example, sealing devices for garage doors, windows, sliding glass doors, and other similar devices, and particularly relates to a self-sealing device for such barriers which eliminates relative friction and wear between the barrier and the seal member as the barrier assumes its closed position.

BACKGROUND OF THE INVENTION

A variety of arrangements are illustrated in the prior art to seal slideable barriers. For example, overhead garage doors have been sealed so as to retain heat and prevent the passage of air, by an arrangement in which, as the door is closed, it is urged both downwardly and inwardly against a frame or a seal member carried by the frame. In such prior arrangements, there has existed a sliding, frictional movement between the barrier and the sealing member which has resulted in seal wear and has necessitated frequent replacement. In some instances the seal has been stationary and the barrier has been moving and in other instances the seal and barrier have been moving in opposite directions. Examples of prior arrangements are shown in U.S. Pat. No. 1,896,347 issued to C. G. Johnson, U.S. Pat. No. 1,948,770 issued to A. V. Rowe, U.S. Pat. No. 2,045,060 issued to R. L. Wheatley, U.S. Pat. No. 2,069,665 issued to E. Bouthillier, U.S. Pat. No. 2,827,114 issued to E. L. Stroup, U.S. Pat. No. 4,119,133 issued to C. R. Wolf.

SUMMARY OF THE INVENTION

The present invention is directed to a sealing device for a slideable barrier, such as a door, for opening and closing an entry, in which the seal member moves substantially laterally against the barrier, or door, as the latter approaches closed position. The sealing device is provided with a plurality of links which act to force the seal member laterally against the barrier, or door, as the barrier, or door, is moved toward closed position.

DETAILED DESCRIPTION OF THE PRESENTLY PREFERRED EMBODIMENTS

Figure 1:
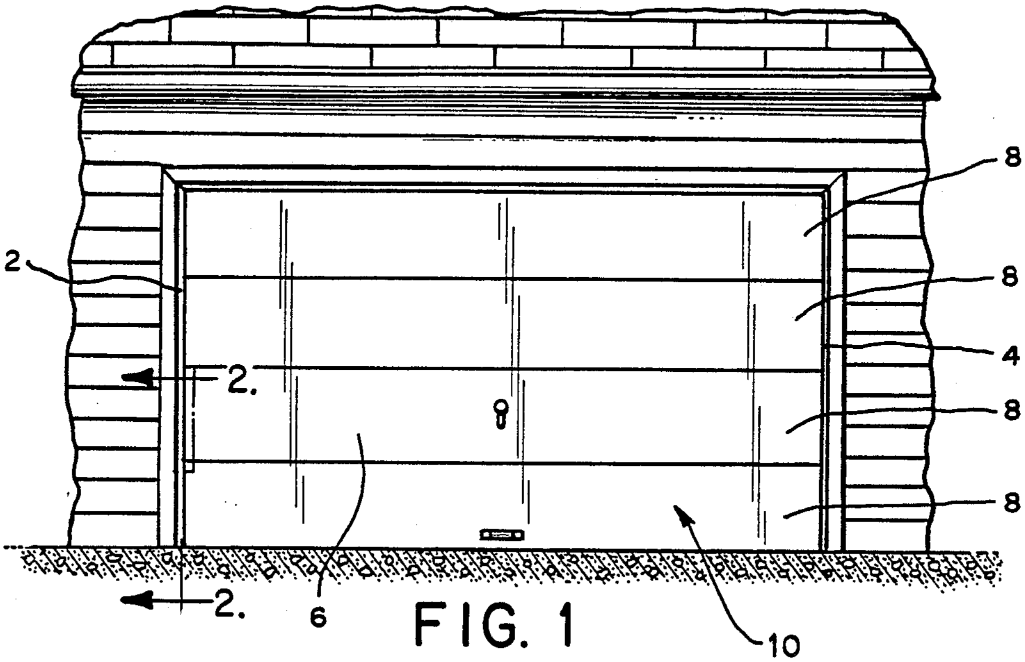
FIG. 1 is a front view of a closed garage door employing an embodiment of the invention.

Turning now to the drawings, FIG. 1 shows an exterior view of an embodiment of the invention as installed to seal the vertical jamb/door joints of a residential overhead garage door. A segmented panel door 10 is shown in its closed position. Sealing devices 2, 4 are located on each side of the door 10. When activated, the sealing devices 2, 4 seal the area between vertical jamb and door joints and thereby prevent the passage of air through that area.

Figure 2:
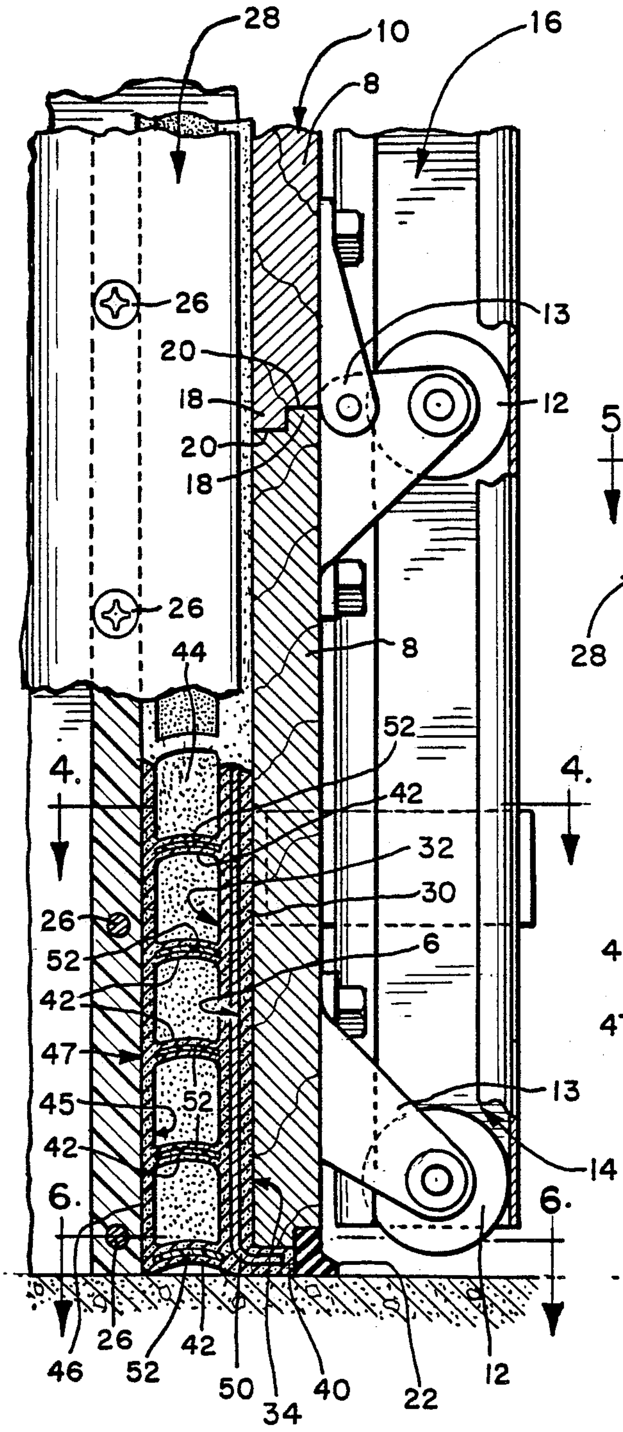
FIG. 2 is a side view, partially broken away, taken along line 2—2 of FIG. 1, with the overhead garage door of FIG. 1 in its closed position.
Figure 3:
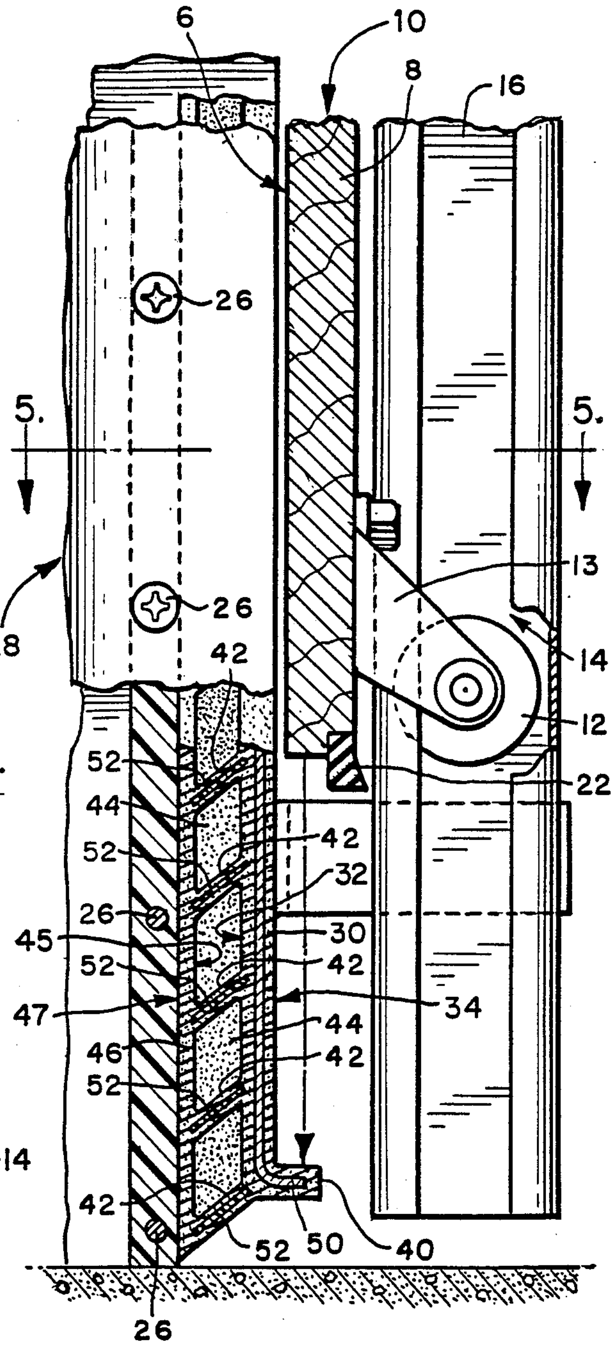
FIG. 3 is a side view, partially broken away, taken along line 2—2 of FIG. 1, with the overhead garage door of FIG. 1 in a partially open position.

As best shown in FIGS. 2 and 3, a conventional overhead garage door 10 includes a plurality of individual panels 8 which are mounted on wheels 12 through brackets 13, 13*a*. The wheels 12 are slideably disposed within channels 14 formed in tracks, generally illustrated as 16. The tracks 16 may include a vertical portion as well as a curved portion (not shown) or a horizontal portion (not shown). The individual door panels 8, are connected to each other and are shown to include a tongue-and-groove arrangement with tongues 18 adapted to lie within grooves 20 when the door 10 is in its fully closed or fully opened position. This tongue-and-groove arrangement allows the panels 8 to move with respect to each other through each portion of the track 16, and, when the door 10 is closed, to provide a relatively effective seal against the passage of air between the panels 8 of the door 10.

The lowermost panel 8 includes a seal 22 embedded in its lower end on the inner portion thereof. When the door 10 is in its fully closed position, the seal 22 engages the ground and prevents the passage of air beneath the bottom panel 8 of the door 10. Although the sealing device 2 has been shown as used with an overhead garage door 10, the features of applicant's invention are not limited to this arrangement and can be used with other apparatus, including other slideable barriers for opening or closing an entry, such as windows.

Figure 6:
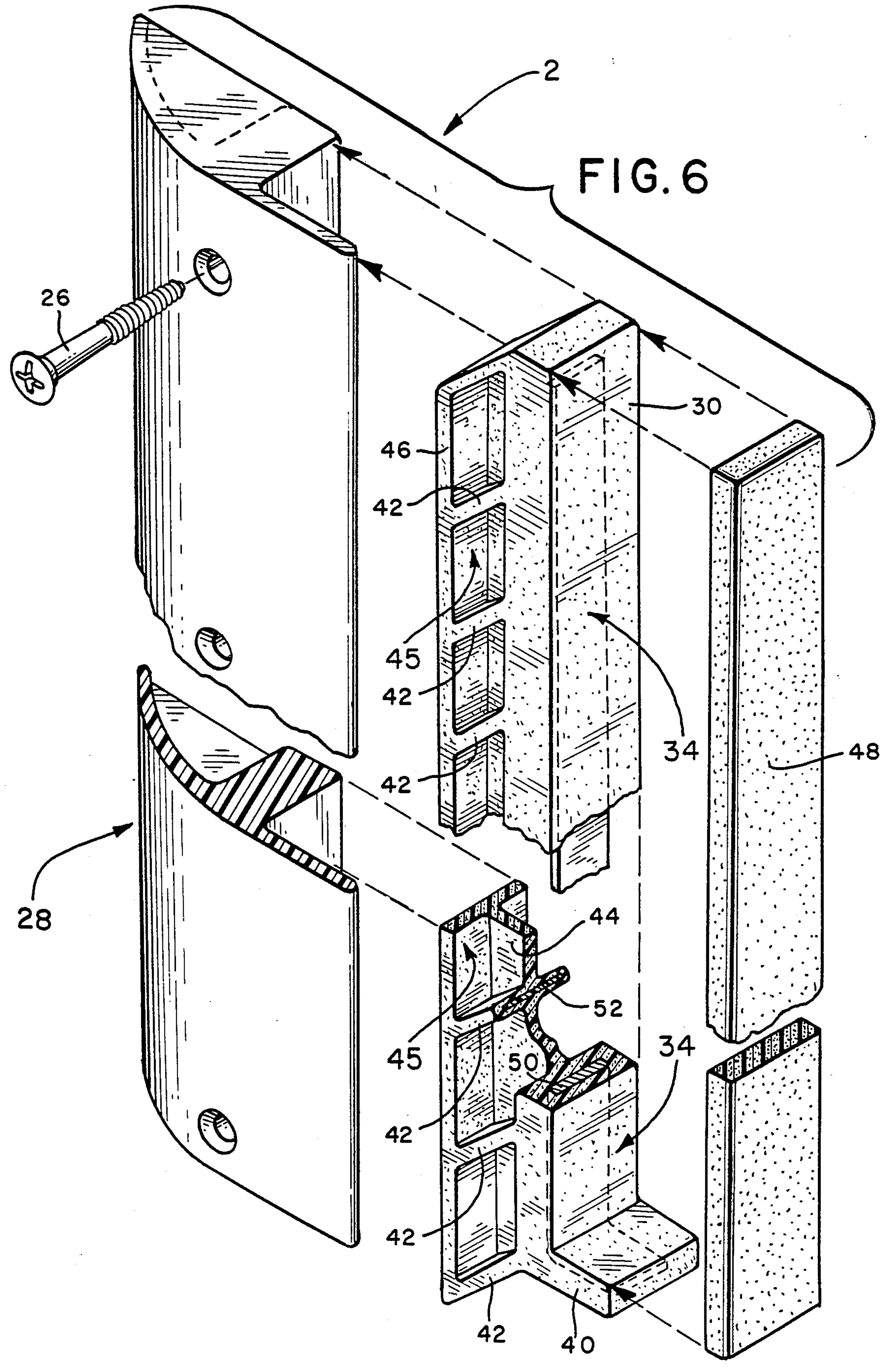
FIG. 6 is an exploded view of an embodiment of the invention.

As best shown in FIGS. 2, 3, and 6, the sealing device 2 includes a striker plate 40 for engagement with door 10 as the door 10 is moved to closed position. A moveable seal member 30 is connected to the striker plate 40. The seal member has an inner face 34 and an outer face 32. A stationary wall 46 is spaced outwardly from the moveable seal member 30. A plurality of links 42 in the form of flexible, resilient, elastic ribs are attached between the outer face 32 of the seal member 30 and to the stationary wall 46. A web 44 may extend between the links 42, and between the seal member 30 and to the stationary wall 46. The stationary wall 46 has an inner face 45 and an outer face 47. The inner face 45 of the stationary wall 46 faces the seal member 30, and is connected to web 44 and the ribs 42.

Preferably the striker plate 40, the seal member 30, the links 42, the web 44, and the outer wall 46 are integrally formed. They may be molded as an integral unit, for example, of plastic or rubber.

The links 42 are made of moldable materials, such as rubber or plastic, and are molded with a cant, or inclination, so that they extend upwardly and inwardly from the stationary wall 46 to the moveable seal member 30 as shown in FIG. 3. The links 42 are elastically deformable to a substantially horizontal or less inclined, position under stress, as shown in FIG. 2. In the horizontal position they provide a bias to return to their original cast molded position, and if the stress is released thereon, their elastic properties will move the seal member 30 upwardly and outwardly away from the side of the door.

A sheet of bendable material 50, preferably a lightweight tempered metal, may be imbedded in the seal member 30 and the striker plate 40. The bendable material 50 can be formed to fit the contour of the door 10, thus forming the seal member 30 to fit the contour of the door 10 and thereby provide a better seal between the door 10 and the seal member 30.

Figure 4:
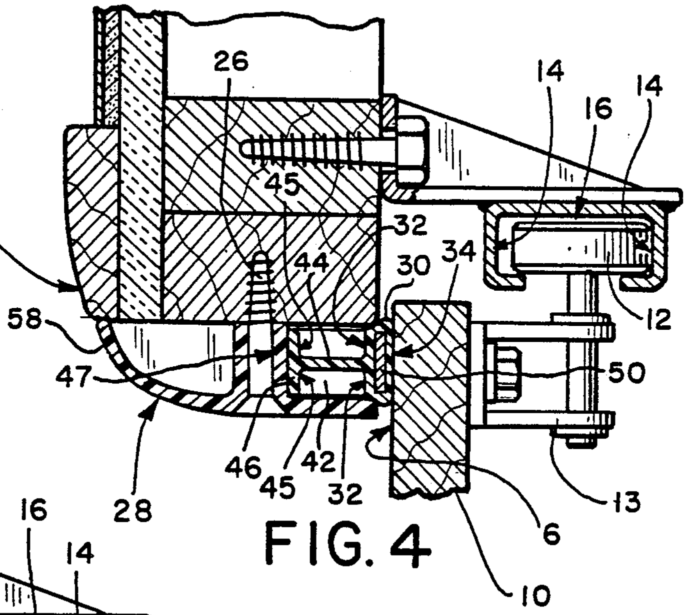
FIG. 4 is a sectional view taken along the line 4—4 of FIG. 2.
Figure 5:
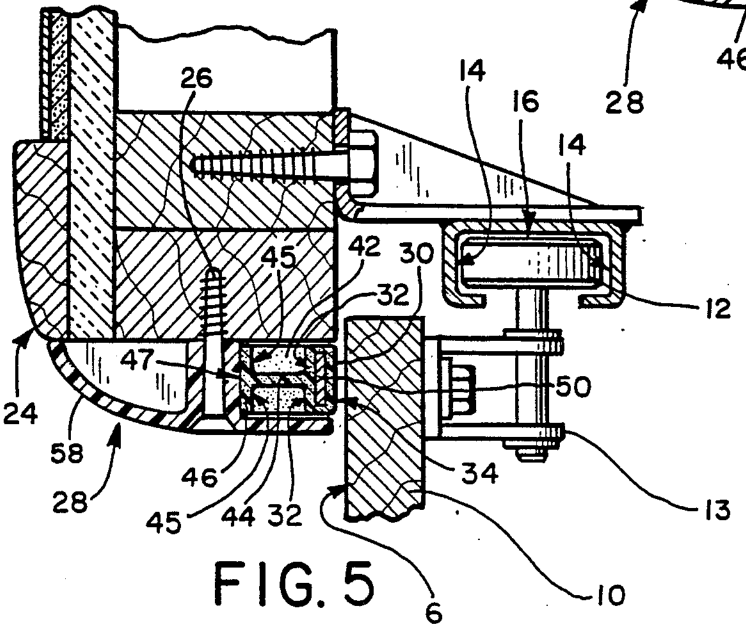
FIG. 5 is a sectional view taken along the line 5—5 of FIG. 3.

As illustrated in FIGS. 2, 4, and 5, the sealing device 2 is contained in and affixed to a housing 28. The sealing device 2 is preferably affixed to the housing 28 by an adhesive. For example, the housing 28 may be affixed to the wall 46 by adhesive between the outer face 47 of the outer wall 46 and the housing 28, although other methods of affixation known to persons skilled in the art may be used.

The housing 28 includes an integral cover 58. The cover 58 hides the sealing device 2 from view, and, when used with a garage door, simulates the molding that is commonly found surrounding the door jambs of a garage door. The housing 28 is adapted to be mounted to the existing vertical support of the door frame 24 by wood screws 26, as shown in FIG. 5.

Although only a single housing 28 attached to a single vertical support is shown, it is understood that in common practice, when the sealing device 2 is used with a garage door, an identical housing 28 and sealing device 4 may be positioned on the opposite side of the door frame 24 as shown in FIG. 1.

As shown in FIG. 6, a readily deformable sealing strip 48, for example, foam rubber or foam rubber with an air-filled cavity, may be attached to the inner face 34 of the seal member 30. Adhesive may be used to attach the deformable element 48 to the outer face 34, however, any type of fastening device, such as screws, staples, nails, and the like, known to those skilled in the art may be used. The deformable sealing element 48 allows the sealing device to conform to the contour of the side 6 of the door 10, and thus further reduces the possibility of air passing between the sealing device 2 and the door 10.

As best shown in FIG. 6, stays 52 may be imbedded into the links 42 to increase their resiliency. Preferably, the stays 52 are made of plastic, but other types of resilient materials may also be used.

Turning now to the operation of the sealing device 2, as best shown in FIGS. 3 and 5, when the door 10 is in its up, or open, position, the links 42 of the sealing device 2 are angled upwardly as shown in FIG. 3. This is the door open position for the sealing device 2, and the links 42 are canted upwardly. In this position, the seal member 30 is spaced a short distance from the side 6 of the door 10.

When the door 10 is lowered, the bottom of the door 10 engages the striker plate 40 and forces it down as shown in FIGS. 2 and 4. As the striker plate 40 and sealing member 30 are forced downwardly, the links 42 are deformed into a substantially horizontal position depicted in FIG. 2. As the links 42 are deformed into a horizontal position, they resiliently force the seal member 30 against the side 6 of the door 10. As best shown in FIGS. 2 and 4, the sealing device is positioned so that when the door 10 is fully lowered, the resilient links force the seal member 30 so as to abut the side 6 of the door 10 with sufficient force to form a seal against the door 10.

Because of the elastic nature of the links 42, as well as web 44, the seal member 30 will return to its original position, as shown in FIG. 3, when the door 10 is raised to its open position.

Of course, it should be understood that various changes and modifications to the preferred embodiment described herein will be apparent to those skilled in the art. Such changes and modifications can be made without departing from the scope of the present invention and without diminishing its attendant advantages. It is, therefore, intended that such changes and modifications be covered by the following claims.

I claim:

1. A sealing device adapted to seal one side of a door or barrier which is slideable along a linear path between open and closed positions, the combination comprising:

a moveable seal member having an outer side adapted to face away from the slideable barrier and an inner side adapted to face toward the slideable barrier, a stationary wall member having an inner face, being spaced outwardly from the outer side of said moveable seal member and adapted to be mounted stationary relative to said seal member, deformable, resilient link means mounting said moveable seal member on said stationary wall member, said seal member being moveable on deformation of said link means in a first direction along said linear path with a movement having an inward lateral component and in a second direction along said linear path with a movement having an outward lateral component, said link means when moved in the first direction biasing said seal member in the second direction, a striker member adapted to be moved in said first direction by said slideable barrier when said slideable barrier is moved toward the closed position, said moveable seal member being connected to said striker member whereby as said striker member is moved by said slideable barrier then said sealing element is moved generally inwardly on said link means in said first direction and as said striker member is released by said slideable barrier then said sealing element is moved in said second direction by said link means.

2. The sealing device of claim 1 wherein said resilient link means is attached to said outer side of said seal member.

3. The sealing device of claim 2 wherein said resilient link means is attached to said inner face of said stationary wall.

4. The sealing device of claim 3 wherein said inner side of said seal member includes a deformable strip for accommodating the contour of said slideable barrier.

5. The sealing device of claim 4 wherein said deformable strip is foam.

6. The sealing device of claim 1 further comprising a sheet of bendable material imbedded in said seal member and in said striker plate.

7. In a sealing device adapted for use with slideable doors, or barriers, the combination comprising:

an elongate moveable seal member having an inner face adapted to face the side of a barrier and an outer face adapted to face away from the side of the barrier, an elongate stationary wall member disposed substantially parallel to the seal member and adapted to be secured in a stationary position, a plurality of substantially parallel elastic links disposed at a plurality of locations along the lengths of the seal member and the stationary wall member, said seal member, stationary wall member, and elastic links being formed of an integral unit of molded material.

8. The sealing device of claim 7, further comprising web means extending between said stationary wall member and said moveable seal member for forming a blockage therebetween.

9. The sealing device of claim 8 wherein said resilient stays comprise plastic elements.

10. The sealing device of claim 7 in which said molded material is rubber.

11. The sealing device of claim 7 in which said molded material is plastic.

12. A sealing device adapted to seal one side of a door or barrier which is slideable along a linear path between open and closed positions, the combination comprising:

a moveable seal member having an outer side adapted to face away from the slideable barrier and an inner side adapted to face toward the slideable barrier, a stationary wall member having an inner face, being spaced outwardly from the outer side of said moveable seal member and adapted to be mounted stationary relative to said seal member, deformable, resilient link means connected between said moveable seal member and said stationary wall member, the resilient link means including resilient stays, said seal member being moveable on said link means in a first direction along said linear path with a movement having an inward lateral component and in a second direction along said linear path with a movement having an outward lateral component, said link means when moved in the first direction biasing said seal member in the second direction, a striker member adapted to be moved in said first direction by said slideable barrier when said slideable barrier is moved toward the closed position, said moveable seal member being connected to said striker member whereby as said striker member is moved by said slideable barrier then said sealing element is moved generally inwardly on said link means in said first direction and as said striker member is released by said slideable barrier then said sealing element is moved in said second direction by said link means.

13. A sealing device adapted to seal one side of a door or barrier which is slideable along a linear path between open and closed positions, the combination comprising:

a moveable seal member having an outer side adapted to face away from the slideable barrier and an inner side adapted to face toward the slideable barrier, a stationary wall member having an inner face, being spaced outwardly from the outer side of said moveable seal member and adapted to be mounted stationary relative to said seal member, deformable, resilient link means connected between said moveable seal member and said stationary wall member, a web attached to said resilient link means and to said outer side of said seal member and to said inner face of said stationary wall for blocking the passage of air between said link means, said seal member being moveable on said link means in a first direction along said linear path with a movement having an inward lateral component and in a second direction along said linear path with a movement having an outward lateral component, said link means when moved in the first direction biasing said seal member in the second direction, a striker member adapted to be moved in said first direction by said slideable barrier when said slideable barrier is moved toward the closed position, said moveable seal member being connected to said striker member whereby as said striker member is moved by said slideable barier then said sealing element is moved generally inwardly on said link means in said first direction and as said striker member is released by said slideable barrier thens aid sealing element is moved in said second direction by said link means.

* * * * *